US005214473A

United States Patent [19]

Kusumoto

[11] Patent Number: 5,214,473

[45] Date of Patent: May 25, 1993

[54] IMAGE FORMING APPARATUS WITH MANUAL MODE EXPOSURE RANGE SHIFTING CONTROL

[75] Inventor: Keiji Kusumoto, Osaka, Japan

[73] Assignee: Minolta Camera Kabushiki Kaisha, Osaka, Japan

[21] Appl. No.: 504,097

[22] Filed: Apr. 4, 1990

Related U.S. Application Data

[63] Continuation of Ser. No. 173,452, Mar. 25, 1988, abandoned.

[30] Foreign Application Priority Data

Mar. 27, 1987 [JP] Japan .................................. 62-75179
Mar. 27, 1987 [JP] Japan .................................. 62-75180
Mar. 27, 1987 [JP] Japan .................................. 62-75181
Mar. 27, 1987 [JP] Japan .................................. 62-75182
Mar. 27, 1987 [JP] Japan .................................. 62-75183

[51] Int. Cl.5 ...................... G03G 15/04; G03B 27/72

[52] U.S. Cl. ...................................... 355/214; 355/69; 355/77; 355/120

[58] Field of Search ................. 355/206, 208, 214, 67, 355/69, 71, 75, 120, 77

[56] References Cited

U.S. PATENT DOCUMENTS 3,513,308 5/1970 Tajima et al. ..................... 355/69 X
4,320,964 3/1982 Ishida et al. .......................... 355/69
4,390,267 6/1983 Minor .............................. 355/67 X
4,394,087 7/1983 Irie et al. ............................ 355/314
4,534,642 8/1985 Miura et al. ......................... 355/214
4,540,269 9/1985 Nishiyama ........................ 355/75 X
4,542,985 9/1985 Honma et al. ........................ 355/69
4,543,643 9/1985 Shibazaki et al. ................... 364/900
4,624,547 11/1986 Endo et al. ....................... 355/69 X
4,627,712 12/1986 Usami ............................ 355/214 X
4,640,603 2/1987 Honma ............................. 355/69 X
4,714,945 12/1987 Fujiwara et al. ..................... 355/69
4,755,852 7/1988 Fujita ............................. 355/214 X

FOREIGN PATENT DOCUMENTS 59-198471 11/1984 Japan .

*Primary Examiner*—Fred L. Braun
*Attorney, Agent, or Firm*—Burns, Doane, Swecker & Mathis

[57] ABSTRACT

An image forming apparatus has two exposure control modes, automatic and manual, and a controlling section to switch the mode from one to another. When the exposure control mode is switched from automatic to manual, the medium value of the exposing degree range, from which the user may choose, is controlled to be equal to the exposing degree determined in automatic mode. However, if the exposing degree was not determined when in automatic mode, or if its change of the original is detected, e.g., in case of job interruption, a predetermined value is fixed to be the median of the exposing degree range.

18 Claims, 9 Drawing Sheets

IMAGE FORMING APPARATUS WITH MANUAL MODE EXPOSURE RANGE SHIFTING CONTROL

This application is a continuation of application Ser. No. 07/173,452, filed Mar. 25, 1988, now abandoned.

BACKGROUND OF THE INVENTION

1. Field of the Invention

This invention relates to an image forming apparatus, which forms an image on a sheet by exposing an original to light, such as an electrophotographic copying machine and, more specifically, to an apparatus which allows exposing degree to be adjusted automatically or manually, whichever desired.

2. Description of the Prior Art

As Japanese Patent, Publication (KOKAI) No. 59-198471 discloses, in conventional copying machines, which allow users to determine whether to set the exposing degree automatically or manually, the standard and the initial exposing degree in manual exposure control mode is set equal to the degree automatically determined by means of exposure lamp voltage and the degree is indicated by the indicator, when the mode is switched from automatic to manual. Such a mechanism is convenient since the standard and the initial degrees in automatic and in manual mode are set to be the same and there is no confusion in exposure control after the mode is switched from automatic to manual.

However, these conventional copying machines have a serious drawback. In case there are seven intermittent exposing degrees to choose from and the automatically determined degree produces the second possible darkest image (step 6), the image can be darker by only one step much (step 7); the range of density choice in manual mode is not wide enough and thus unsatisfactory. It may even be impossible to make the image darker or lighter if the automatically chosen exposing degree corresponds to the darkest or to the lightest of the range, respectively.

SUMMARY OF THE INVENTION

An image forming apparatus according to the present invention overcomes the disadvantage discussed above with the following features.

The main object of this invention is to provide an image forming apparatus that makes any automatically determined exposing degree to be the median degree in manual mode by means of exposure lamp voltage, when the mode is switched.

The second object of this invention is to provide an image forming apparatus that employs predetermined exposing degrees for manual mode when data obtained in automatic mode is insufficient to determine the median degree in manual mode.

The third object of this invention is to provide an image forming apparatus that senses the opening and the closing of the document cover in order to obtain proper median exposing degree in manual mode which varies as the densities of the originals are different from one another.

The fourth object of this invention is to provide an image forming apparatus that avoids unsuccessful copying, which may occur when a job in automatic exposure control mode is interrupted and the original to be copied as well as the mode is changed, by assigning predetermined exposing degrees to density steps for the interrupting job.

The fifth object of this invention is to provide an image forming apparatus that is successful in both the interrupting and the interrupted jobs in manual exposure control mode by memorizing the median exposing degree of the interrupted job.

Further features and advantages of the invention will be better understood by reference to the following description, and to the drawings forming a part thereof.

DETAILED DESCRIPTION OF THE INVENTION

One of the preferred embodiments of the present invention is brought into focus and described below referring to the figures.

Figure 1:
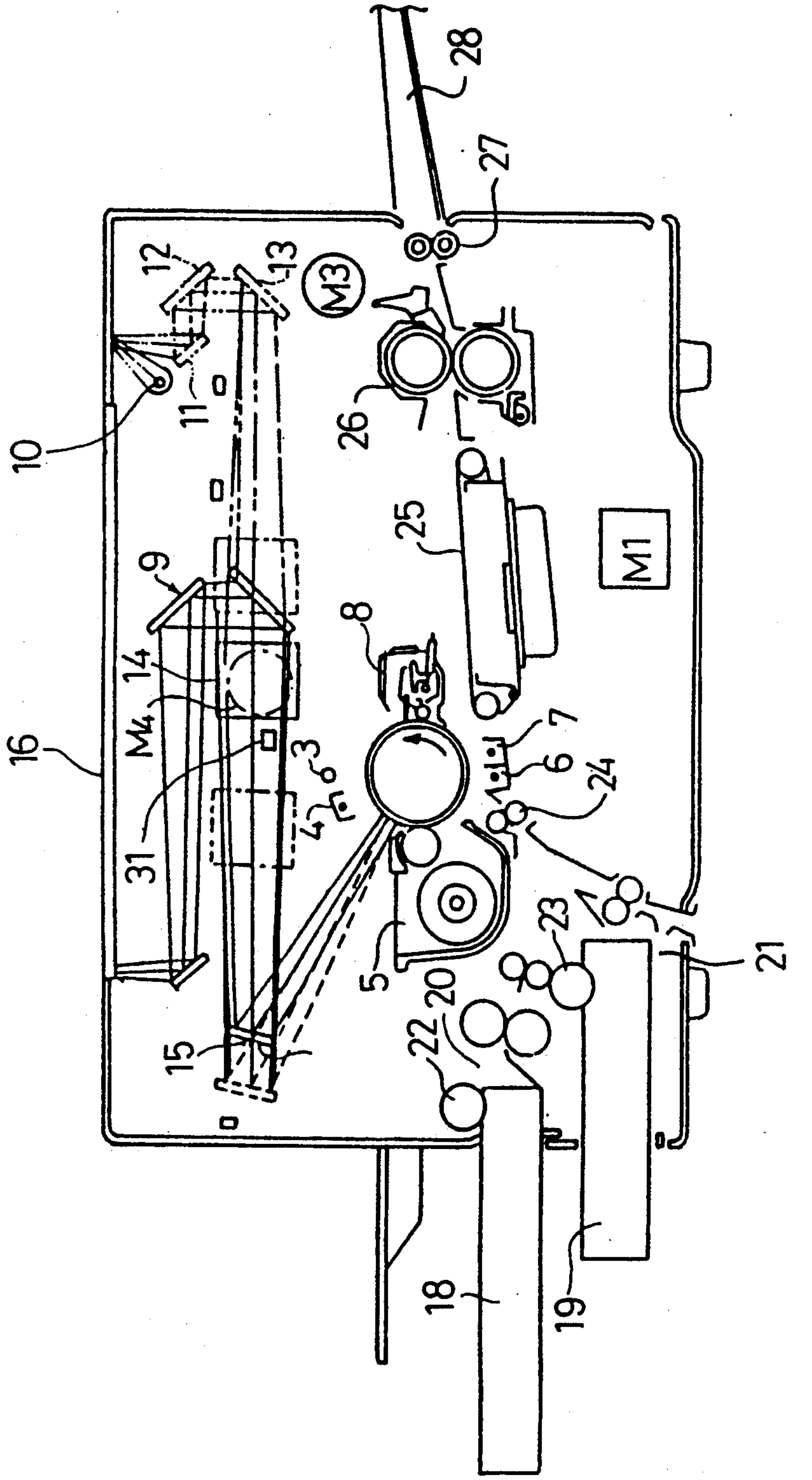
FIG. 1 is a cross-sectional side view of an exemplary electrophotographic copying machine employing the principles of the present invention.

FIG. 1 shows an electrophotographic copying machine which employs the principles of the present invention. In such a copying machine, a photoconductive drum 1 is disposed approximately in the center of the main body to rotate counterclockwise. Arranged around the drum 1 are an eraser lamp 3, a sensitizing charger 4, a microtoning developer 5, an image transfer charger 6, a paper separating charger 7, and a blade cleaner 8. The surface of the drum 1 is charged and exposed to an optical image emitted from the optical system 9.

The optical system 9, which is located under the document table 16 that supports the original to be copied, comprises an exposure lamp 10 as a light source, three movable mirrors 11, 12, 13, a projection lens 14, and a deflection mirror 15 which directs the projected light toward the drum 1. The light source 10 and the first movable mirror 11 move to the left at the same speed of v/n, and the second and the third movable mirrors 12, 13 move also to the left at the same speed of v/2n, where n designates the ratio of the size of the copied image to that of the original image, while the photoconductive drum 1 rotates at a circumferential speed of v which is constant irrespective of n. When the value of n is changed, the projection lens 14 moves along the optic axis and the deflection mirror 15 moves and swings so that the projection magnification would also be changed.

Papers, on which the images are copied, are stacked in cassettes 18, 19 that belong to paper feeding sections 20, 21 of the copying machine. The papers are fed alternately from the two cassettes 18, 19 as either one of the paper feeding rollers 22, 23 functions. The paper fed by the feeding roller is further conveyed to the image transfer section by a register roller 24 coincidentally with the image formed on the surface of the photoconductive drum 1. The image is copied on the paper in this image transfer section, and then the paper is sent to heat rollers 26 via a conveyer 25 in order to fixing the copied image on the paper. After the fixing process, the paper is transferred to a paper discharge tray 28 by a discharging roller 27. In addition, an AE sensor 31 which receives the projected light from the optical system 9 is attached adjacent to the pathway of the projection lens 14 and detects original densities.

Figure 2:
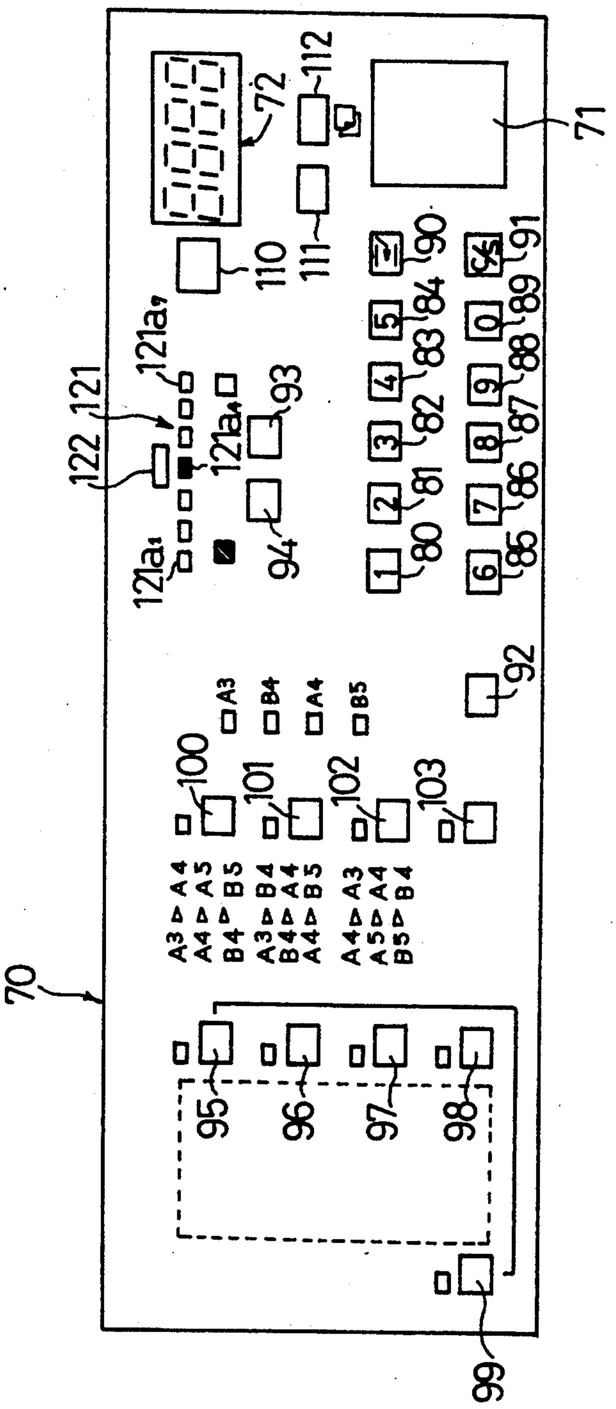
FIG. 2 is an enlarged elevational view of the control panel of the copying machine shown in FIG. 1.
Figure 3:
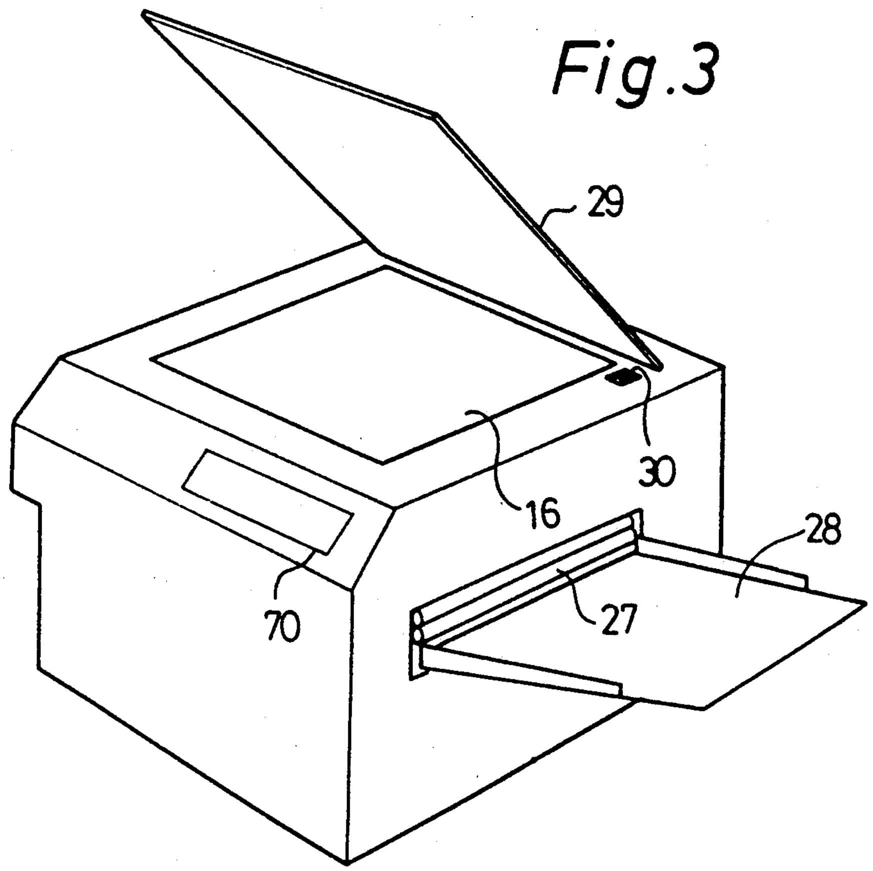
FIG. 3 is an isometric view of the copying machine shown in FIG. 1 when the document cover is open.

As shown in FIG. 3, there is a control panel 70 on the slope which is located in the upper part of the main body. The enlarged and detailed illustration of the control panel 70 is shown in FIG. 2. As can be seen by reference to FIG. 2, the panel 70 consists of a print key 71 which starts the copying operation when pressed, a digital display window 72 which informs number of copied papers, percentage of enlargement or reduction, and others, numerical keys 80, 81, 82, 83, 84, 85, 86, 87, 88, 89, which correspond to 1 through 9 and 0, an interruption key 90 to interrupt the copying operation and conduct a different job that requires a different copying condition, a clear/stop key 91, a paper selection key 92 to select the cassette which contains papers of desirable size, UP key 93 to lighten and DOWN key 94 to darken the image density, and eight keys each of which is assigned to a fixed percentage of image enlargement or reduction. Above the UP 93 and DOWN 94 keys are located seven LEDs $121a_1$ to $121a_7$ (density indicator 121) that indicate the density of the image in manual mode. An automatic exposure key 122 to set the mode on automatic is located further above the density indicator 121. The image density, i.e. exposing degree, is controlled stepwise by the UP 93 and DOWN 94 keys when in manual mode; one press of the key corresponds to lightening (UP key) or darkening (DOWN key) as much as to light the LED of the density indicator 121 adjacent to the one that was lit before. When in automatic exposure control mode, the LED which indicates the median density $121a_4$ is lit. If automatically determined density is unsatisfactory and density change is desired, the user only has to press UP 93 or DOWN 94 keys and the mode is switched to manual exposure control from automatic without any other additional operation.

Keys to select one of the fixed percentages of enlargement or reduction 95–103 are grouped into two: 95 through 99, and 100 through 103. The keys that belong to the first group except 99, i.e. 95 through 98, function only when key 99 is pressed beforehand. The desired percentages, when they are input through numerical keys 80–89, are displayed in the display window 72 and can be memorized and assigned to the keys 95–98. On the contrary, the keys that belong to the second group, i.e. 100 through 103, are assigned to predetermined percentages and are fixed.

When multicopying is under way and the interruption key 90 is pressed, a totally different copying can be pursued, and, the multicopying can be completed afterwards just by pressing the interruption key when the interrupting job is over. There are keys to select the percentage of enlargement and reduction: a key 110 to set the percentage, an UP key 111 to scrollingly increase the percentage by a fixed incremental unit value, and a DOWN key 112 to similarly reduce the percentage also by a fixed incremental unit value.

At the one end of the document table 16, a document cover 29 is fixed by an axis so that it may cover and uncover the table. A switch 30 detects the opening and the closing of the cover and is switched on when closed.

Figure 4:
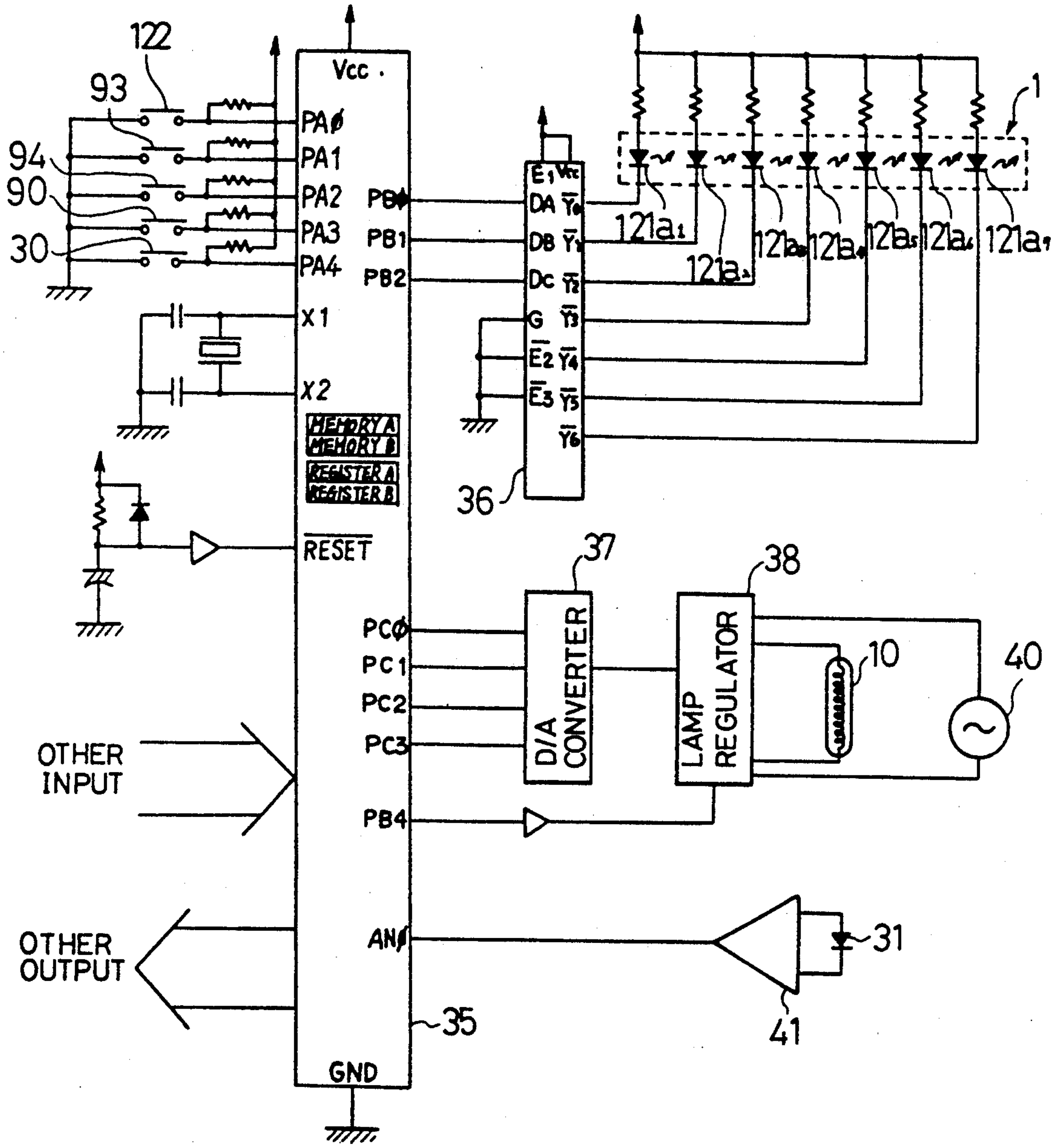
FIG. 4 is a block diagram of a control circuit of the present invention incorporated in a copying machine.

As can be seen by reference to FIG. 4, a behavior controlling circuit is designed in such a way that one chip microcomputer 35, which controls exposure voltage, is placed in the center. Signals from the automatic exposure key 122, the UP key 93, the DOWN key 94, the interruption key 90, and the switch 30 are input to the input ports PA0 through PA4 of this microcomputer 35; when one of the above keys is pressed, signal "0" is input. Further, the three bit output ports PB0 through PB2 of the microcomputer 35 give driving signals to a driving decoder 36, which drives the prementioned LED indicator 1.

Another set of output ports PC0 through PC3 is responsible for controlling exposure lamp voltage, and an analog voltage is supplied from a D/A converter 37 to an exposure lamp regulator 38 as a four bit code is input to the D/A converter 37 from the output ports. The exposure lamp regulator 38 then supplies voltage to the exposure lamp 10 in amount that is determined by the analog voltage from the D/A converter 37, voltage that originated from the remote signal from the output port PB4 of the microcomputer 35.

In addition, there is a single phase alternating current (AC) generator 40, an image density detection circuit 41 which alternates the voltage of the reflective light emitted from the original, and an AE sensor 31 as parts of the whole circuit. The output from the image density detection circuit 41 is put into the analog input port AN0 of the microcomputer 35, which includes an A/D converter, and it is this data that controls the copying machine when in automatic exposure control mode. Besides the above mentioned A/D converter, various kinds of memories and resistors, which are described in detail later in this document, are built in the microcomputer 35, which is not only input various signals for the behavior control but also outputs such signals.

Figure 5:
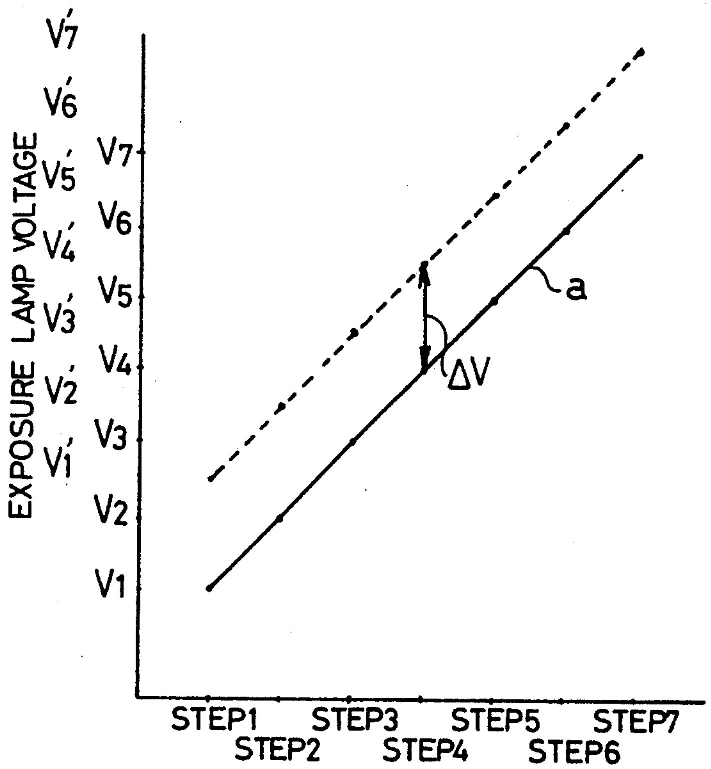
FIG. 5 is a graphic illustration of exposure control steps and of lamp voltage assignment to the steps of the present invention incorporated in a copying machine.

FIG. 5 illustrates an example of exposure control by the said microcomputer 35. The microcomputer 35 memorizes the standard voltage data $V_1$–$V_7$, each of which applies to exposure steps 1–7, for exposure control in manual mode. When the copying machine is turned on, the exposure lamp voltage is varied through UP and DOWN keys 93, 94 as shown by a solid line in FIG. 5, if the autoclear key functions, if the original is exchanged from one to another, or if the interruption key is pressed.

However, when the machine is set to manual exposure control mode after making copies in automatic mode, the way of control is different from the one described above. For example, in case the average voltage of the exposure lamp in automatic mode is $\Delta V$ higher than the standard average voltage $V_4$ which corresponds to step 4, $V_4+\Delta V$ is newly assigned as the exposure lamp voltage $V_4'$ for step 4 and LED $1a_4$ is lit when the mode is switched to manual. Similarly, voltages for other keys $V_1'$–$V_7'$ are also made $\Delta V$ higher than their standard ones $V_1$–$V_7$. In other words, the exposure lamp voltage will be varied along the broken line in FIG. 5 through UP 93 and DOWN 94 keys. Shifting of the respective assigned voltages from $V_1$–$V_7$ to $V_1'$–$V_7'$ is accomplished by a range shift device realized by suitably programming the microprocessor 35 of FIG. 4 to execute a program sequence to be presently described.

Figure 6:
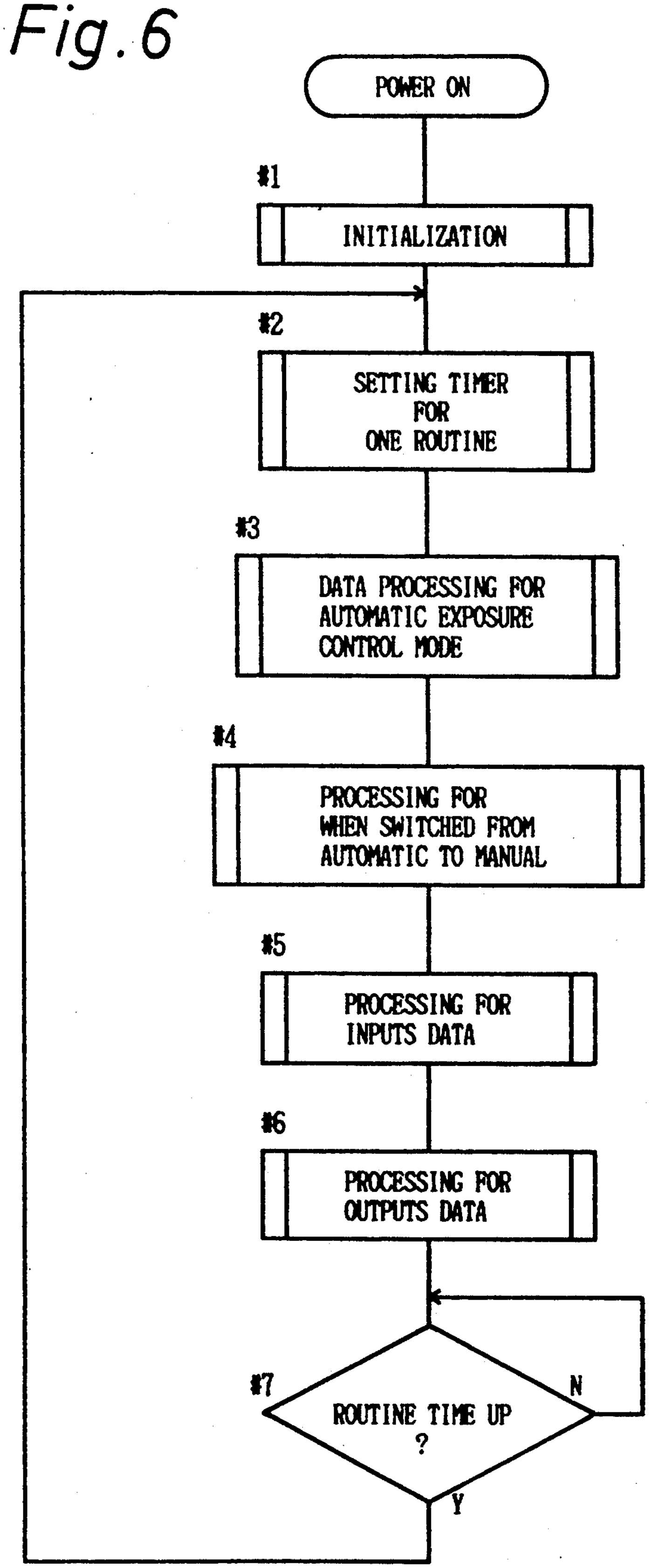
FIG. 6 is a flow chart which shows the main routine of the present invention incorporated in a copying machine.

The exposure control in automatic and that in manual mode is described below referring to the flow charts shown in FIGS. 6 through 11. FIG. 6 is a flow chart of the main routine which controls copying behavior in the circuit as shown in FIG. 4. Immediately after the power is turned on, the initial setting of variables such as of a register and of a timer is conducted as shown as step #1 in FIG. 6. Then, step #2 follows and a timer which regulates the time spent for running the main routine is set. In steps #3 and #4, a subroutine which processes data when in automatic exposure control mode and that which processes data when the exposure control mode is changed from automatic to manual are conducted, respectively.

Steps #5 and #6 follow the above, and some signals which are related to copying operation, are input and also output. These two steps are not further explained in this document, since they are already widely known. When the time determined by the timer is up, the routine is again repeated from step #2 through #7 as long as the power is on.

Figure 7:
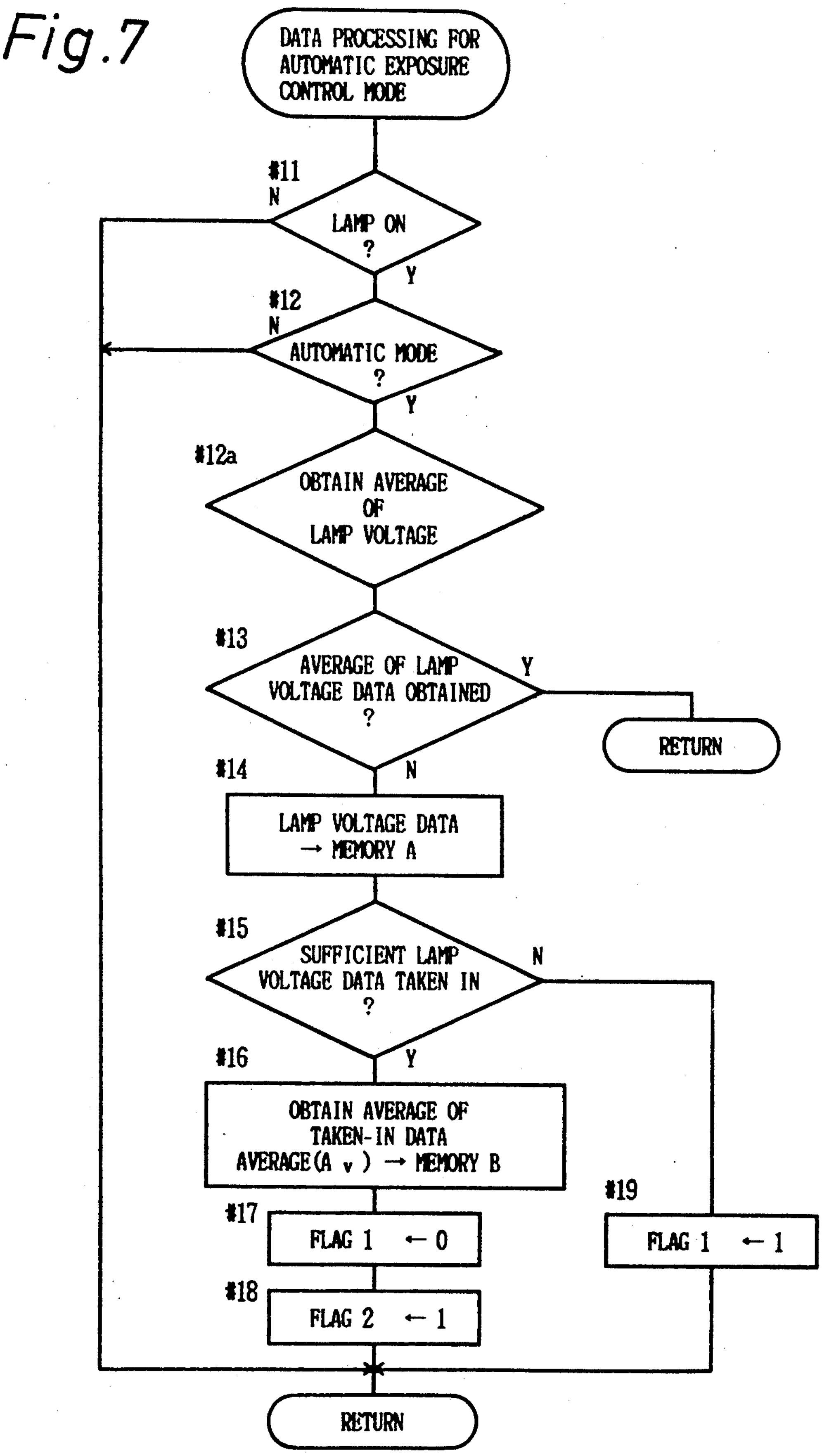
FIG. 7 is a flow chart which is a part of the flow chart shown in FIG. 6, and it shows the data processing subroutine when the exposing degree is controlled automatically.

Step #3 in FIG. 6, a subroutine which processes data when in automatic exposure control mode, is illustrated as a flow chart in FIG. 7. As shown in this figure, the exposure lamp 10 is checked whether it is turned on or off in step #11. When the lamp 10 is off, the subroutine is not conducted any further. When it is on, step #12, which checks the exposure control mode, follows. In case it is manual, the subroutine is not conducted any further. If it is automatic (step #12a), a scanner averages the lamp voltage data which is taken as the scanner moves every fixed distance (for example, every 1 cm). Then step #13 checks the termination of the procedure in step #12. When the termination is confirmed, the averaged lamp voltage is memorized in memory A as shown in FIG. 4 (step #14). In the next step #15, it is checked whether the desired number of the said lamp voltage data is obtained. If not, step #19 is proceeded, and flag 1, which is a flag that indicates whether to assign the predetermined lamp voltage data to the keys, is set to "1" and the predetermined lamp voltage data $V_1$–$V_7$ are employed as in steps #71–#74 which are described later. The desired number of the lamp voltage data varies in accordance with the size of the original. For example, an original which is A4 size may require as many as 20 data while an original of B5 size requires 15 when both originals are placed on the document table in the same way. The size of the originals may be detected in a conventional way or may be input through a switch on the control panel. Moreover, the said desired number of data sets may be varied in accordance with the percentage of enlargement and reduction. If enlargement or reduction is to be conducted, the number may be increased or decreased, respectively.

As shown in FIG. 7, step #15 makes sure that the desired number of data sets are obtained, and then, the average is taken to be memorized in memory B as the average lamp voltage Av (step #16). Number "0" is assigned to flag 1 in step #17, and "1" to flag 2 in step #18. Flag 2 indicates that the average of the lamp voltage data in automatic exposure control mode is taken.

The whole subroutine is accomplished when step #18 is over.

Figure 8:
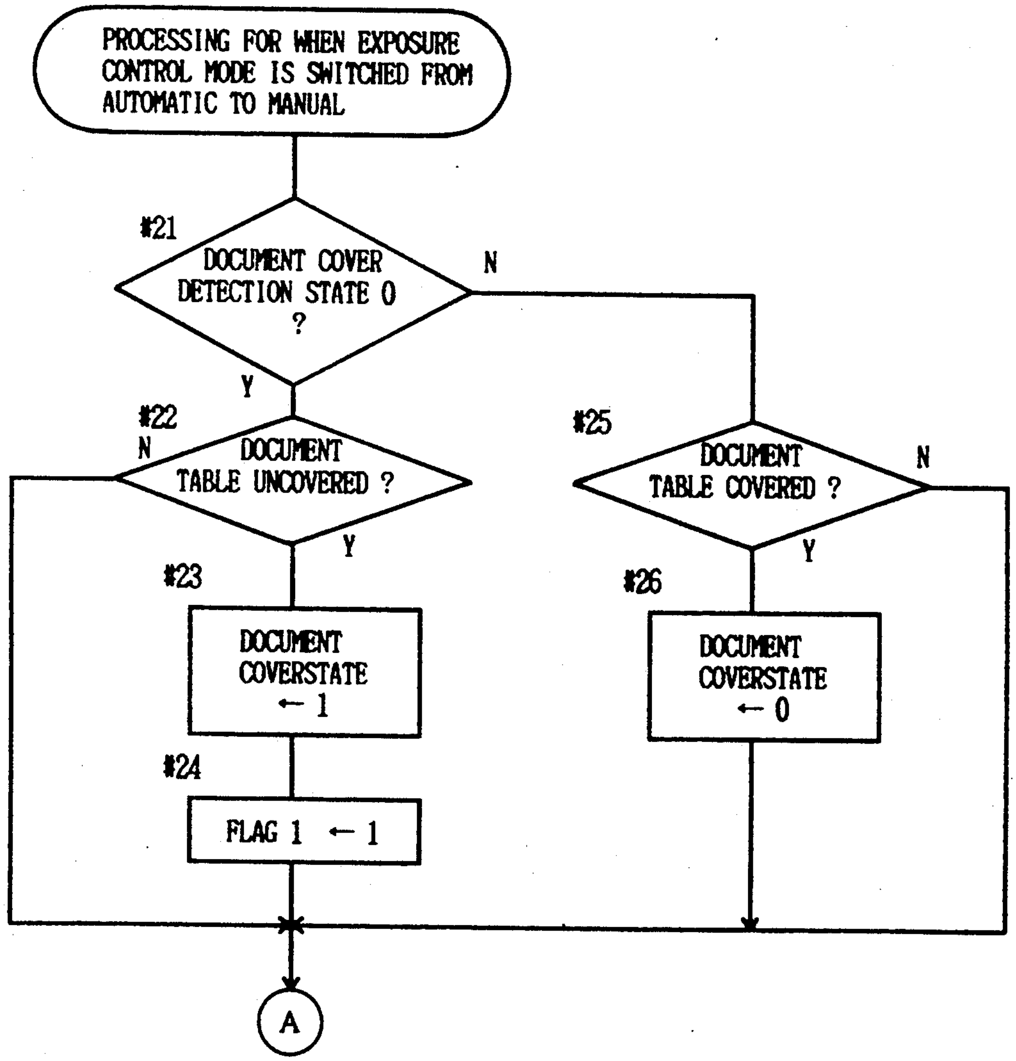
FIGS. 8 to 11 are flow charts which are also parts of the flow chart shown in FIG. 6, and they show the data processing subroutines when the exposure control is changed from automatic to manual.

The data processing subroutine that operates when the mode is changed from automatic exposure control mode to manual referring to FIGS. 8 through 11. FIG. 8 shows a process which senses the exchange of the original on the document table 16 through opening and closing of the document cover 29. In the first step #21 of FIG. 8, the detection state of the document cover 29 is checked. When it is "0", step #22, which checks whether the switch 30 has detected the opening of the document cover 29, is proceeded. If the cover 29 is open, the copying machine assumes that the original has been exchanged, and, number "1" is assigned to the document cover state in step #23 and to flag 1 in step #24. In case the document cover state is "1" in step #21, step #25 checks whether the switch 30 has detected the opening of the document cover. If the switch did detect, the original state is made "0" in step #26.

Figure 9:
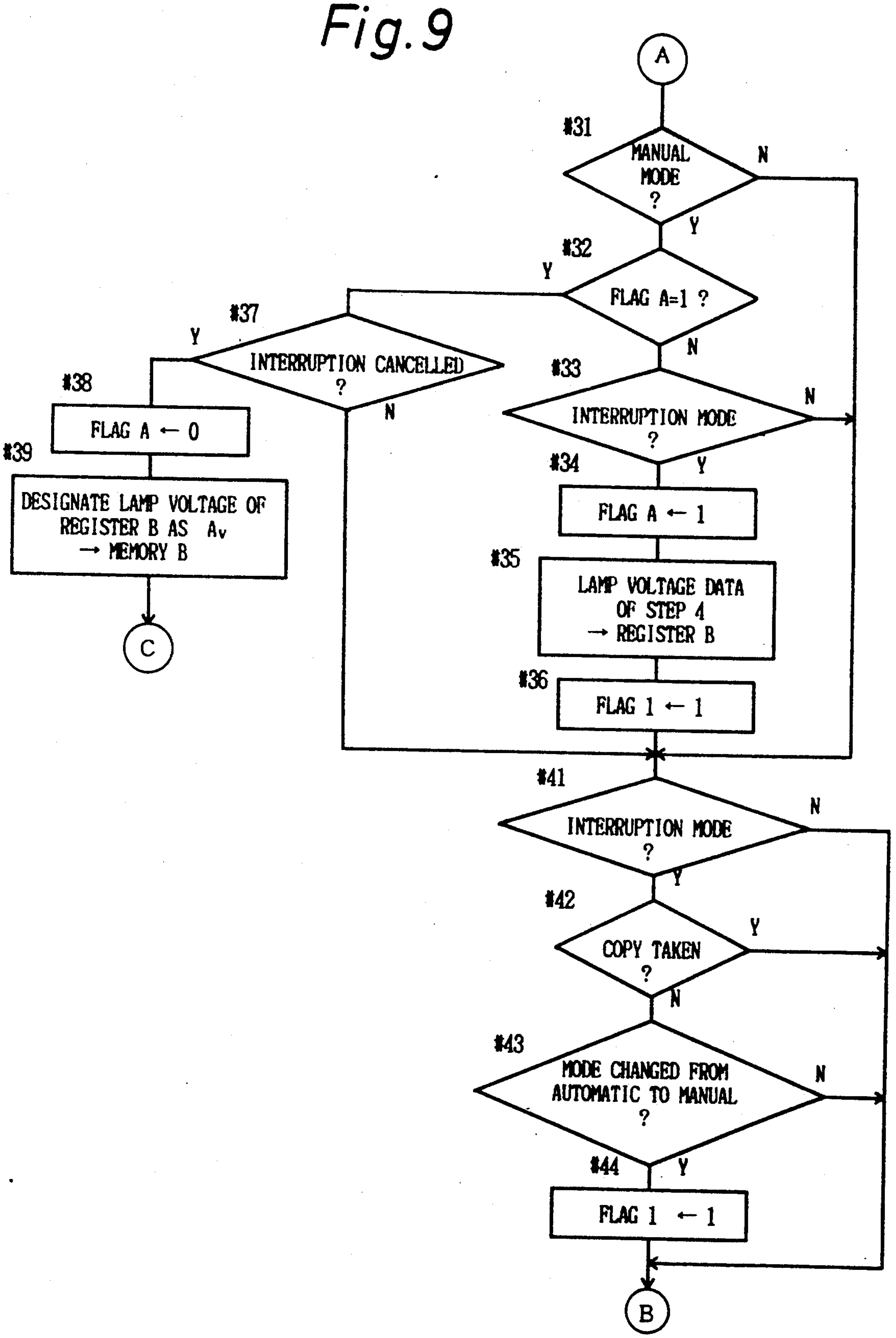

After going through the above steps, that is after proceeding either step #24 or #26, step #31 shown in FIG. 9 is conducted only if the closing of the document cover 29 is not detected and the opening of the cover 29 is not detected in step #31. If the copying machine senses an exchange of the original by going through steps #21–#26, steps #71–#74 are conducted and exposure step data is automatically returned to the predetermined values $V_1$–$V_7$.

As FIG. 9 indicates, the exposure control mode is checked in step #31, and step #32 is conducted if it is manual. Step #32 checks flag A to proceed step #32 when the flag is "1" and step #33 when the flag is not "1". This flag A is assigned to "1" when the exposure control mode is manual and the interruption key is pressed to give the predetermined data $V_1$–$V_7$ to each exposure step for only the early works of the interrupting job.

Step #33 checks the type of the job to be conducted, normal or interrupting. In case of the former, "1" is assigned to flag A (step #34) and the median lamp voltage of the interrupted job is memorized in register B (FIG. 4). This data is recalled when the interrupting job is over and the interrupted job is conducted again. Flag 1 is assigned to "1" in the next step #36.

In case flag A is "1" in step #32, step #37 checks the cancellation of the interruption mode. If canceled, flag A is assigned to "0" in step #38, and then, the lamp voltage data is recalled from the register B and an average Av of the recalled data is taken to be memorized in memory B as shown in FIG. 4 (step #39). The flow then proceeds to step #56 in FIG. 10.

Step #41 is conducted in any of the following cases: when the exposure control mode is detected not to be manual in step #31; when the interruption mode is not detected in step #33; when the cancellation of interruption mode is not detected in step #37; or when step #36 is proceeded.

Step #41 checks whether the job to be conducted is an interrupting one. If so, step #42 is conducted to see whether a photocopy of the original is actually taken. If not, step #43 is conducted; it sees whether the exposure control mode is changed from automatic to manual, and if changed "1" is assigned to flag 1 in step #44.

When the exposure control mode is manual and the switch has sensed that the interruption key 90 is pressed during the conduction of the said steps #31–#36, or when the copying machine is proceeding the interrupting job and the switch has sensed that the exposure control mode is changed from automatic to manual during the conduction of the said steps #41–#44, the predetermined data for exposure steps $V_1$–$V_7$ is employed by going through steps #71–#74, which are described later in this document.

When the exposure control mode is manual and it is sensed that the interruption mode is canceled during the conduction of the said steps #37–#39, the exposure step data for the original job is again employed by going through steps #56–#63, which are also described later in this document.

Figures 10, 11:
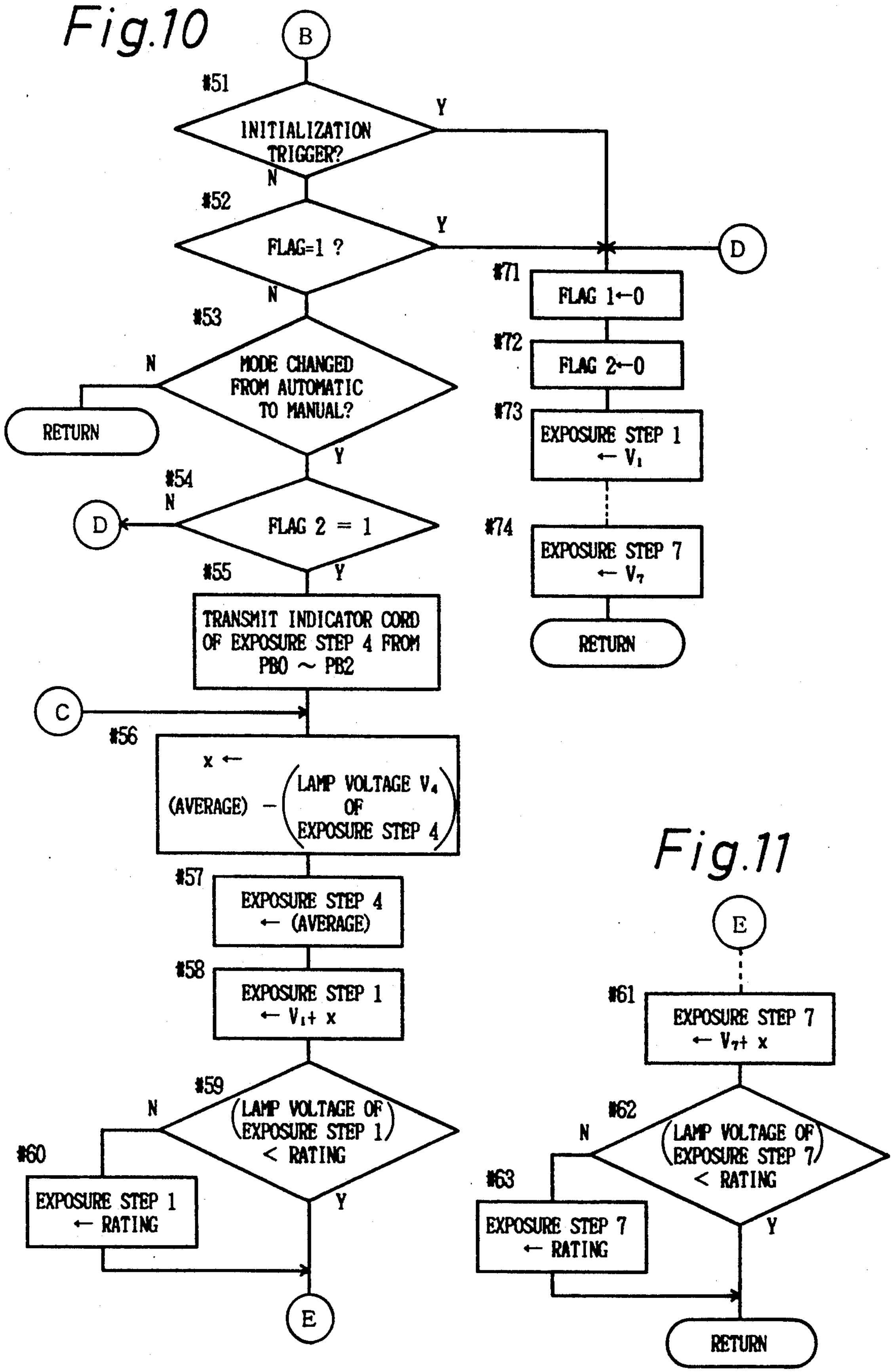

Step #51 in FIG. 10 succeeds either one of the four steps: step #41 when the copying machine is not in interruption mode, step #42 when actually a photocopy is taken, step #43 when the exposure control mode is not changed from automatic to manual, or step #44.

Step #51 checks whether triggers for initialization of auto-reset, main switch-on, and etc. are input. If not, step #52 is proceeded to check the status of flag 1. Step #53 succeeds step #52 when flag 1 is not "1", and terminates the whole subroutine after it is confirmed that the exposure control mode was not changed from automatic to manual. When there was a change from automatic to manual, the status of flag 2 is checked. If it is "1", step #55 proceeds to output an indicator code for exposure step 4 from the output ports PB0–PB2 so that the LED $121a_4$ of the prementioned exposure step 4 is lit.

Step #56 succeeds this step #55 or step #39 which is shown in FIG. 9. In step #56, the difference between two lamp voltage values, the averaged voltage Av which has been memorized in memory B through step #16 or #39 and the predetermined voltage for exposure step 4 ($V_4$), and is memorized in memory x. Then, the said averaged data is assigned to exposure step 4 in step #57. In addition, step #1 adds up the predetermined voltage for step 1 ($V_1$) and the said data in memory x, and assigns the added number to exposure step 1. It should be noted that the predetermined data $V_1$–$V_7$ for each exposure step 1–7 is fixed in the microcomputer 35.

Step #59 follows the above and checks whether the said lamp voltage of exposure step 1 is in the acceptable range. If the voltage is not in the range, the predetermined voltage is assigned to exposure step 1. If the voltage is in the range, the same is checked for each exposure step 2–7, which is assigned to each predetermined value if it is not in the range as well as step 1, as shown in FIG. 11 (steps #61–#63) and the subroutine is terminated.

Steps #71 and #72, which make flag 1 and flag 2 "0", respectively, follow one of the three steps: step #51 when the initialization triggers are input, step #52 when flag 1 is "1", or step #54 when flag 2 is not "1". After assigning the predetermined lamp voltage data to exposure steps 1–7 as in steps #73 and #74, the subroutine is terminated.

The lamp voltage data may not be obtained as many as desired in number when the exposure control mode is changed from automatic to manual during copying, or when copying is interrupted by such a trouble as paper jam. The further detailed description of the copying machine and the general information about the function of the interruption key are disclosed in U.S. Pat. No. 4,543,643.

What is claimed is:.

1. In an original exposing device operable in an automatic exposure mode in which exposing degree is varied automatically in accordance with the density of an original and in a manual mode in which exposing degree is varied manually within a predetermined variable range in accordance with manual adjusting operation, the method comprising the steps of:
obtaining the average exposing degree in an automatic exposure mode; and
shifting the predetermined variable range of manual exposure mode so as to cause said average exposing degree of automatic exposure mode to become a median in the shifted variable range.

2. In an image forming apparatus operable in an automatic mode in which power supplied to an image forming means is varied automatically in accordance with the density of an original and in a manual mode in which power supplied to the image forming means is varied manually within a predetermined variable range in accordance with manual adjusting operation, the method comprising the steps of:
obtaining the average power degree in an automatic mode; and
shifting the predetermined variable range of manual mode so as to cause said average degree of automatic mode to become a median in the shifted variable range.

3. An original exposing device comprising:
exposing means for exposing an original in various degrees;
detecting means for detecting original density;
automatic exposure means for adjusting exposure automatically in accordance with the original density through increase and decrease of exposing degree;
manual exposure means for adjusting exposure manually through increase and decrease of exposing degree within a predetermined variable range;
selecting means for selecting either manual mode in which the manual exposure means is active or automatic mode in which the automatic exposure means is active; and
range shift means for shifting said variable range of the exposing degree so as to cause the exposing degree determined by automatic exposure means to become the median in the shifted variable range.

4. The original exposing device of claim 3 wherein said range shift means shifts said variable range when the mode is switched from automatic to manual.

5. The original exposing device of claim 3, further comprising:
displaying means for displaying exposure information which includes at least a first indicator element corresponding to minimum exposure degree, a second indicator element corresponding to median exposure degree and a third indicator element corresponding to maximum exposure degree and indicates the degree of exposure through selective operation of said indicator elements when in manual mode; and
means for controlling said display means so that said second indicator element is operated when the mode is switched from automatic to manual.

6. The original exposing device of claim 3 further comprising:
operation means for obtaining the average of the exposing degree in automatic mode;
wherein said range shift means shifts said variable range of the exposing degree so as to cause said average of the exposing degree to become the median in the shifted variable range when the mode is switched from automatic to manual.

7. The original exposing device of claim 6 wherein said operation means samples more than one set of data related to the exposing degree in automatic mode and obtains the average of the exposing degree based on the sampled data.

8. The original exposing device of claim 7 wherein said operation means fixes a predetermined value as the average of the exposing degree irrespective of the sampled data when the number of the sampled data are less than desired.

9. The original exposing device of claim 8 wherein said operation means varies the desired number of data to be sampled in accordance with the size of the originals.

10. The original exposing device of claim 3 further comprising:

a document table which support an original to be exposed;

second detecting means for detecting the exchange of the original on the document table; and second control means for setting a predetermined value as the exposing degree in manual mode in response to the exchange of the original.

11. The original exposing device of claim 10 further comprising:

a document cover which is movable between a closed position where the document cover covers the document table and an opened position where the document cover uncovers the document table;

wherein said second detecting means detects the exchange of the original on the document table when said document cover is moved from the closed position to the opened position.

12. An original exposing device comprising:

exposing means for exposing an original in various degrees;

detecting means for detecting original density;

automatic exposure means for adjusting exposure automatically in accordance with the original density through increase and decrease of exposing degree;

manual exposure means including manual operable member for selecting one of predetermined exposing degrees in accordance with the operation of the manual operable member through increase and decrease of exposing degree within a predetermined variable range;

selecting means for selecting either manual mode in which the manual exposure means is active or automatic mode in which the automatic exposure means is active; and display means for displaying exposure degree in manual exposure mode, said display means including a plurality of display elements one of which corresponds to minimum exposing degree, another one of which corresponds to median exposing degree and still another one of which corresponds to maximum exposing degree in the predetermined variable range;

display controlling means for operating one of said display elements corresponding to the degree selected by said manual exposure means; and range shift means for shifting said variable range of the exposing degree so as to cause the exposing degree determined by automatic exposure means to become the median in the shifted variable range and displaying said display element corresponding to the median degree.

13. An image forming apparatus comprising:

image forming means for forming an image of an original on the surface of a recording medium;

supplying means for supplying power to the image forming means in variable degrees;

detecting means for detecting original density;

first controlling means which automatically selects one of the power degrees according to original density;

second controlling means which manually selects one of power degrees within a predetermined variable range;

selecting means for selecting either first mode in which the first controlling means is active or second mode in which the second controlling means is active;

storage means for storing the power degree selected by said first controlling means in the first mode; and range shift means for shifting said variable range of the power degree so as to cause the power degree stored by said storage means to become the median in the shifted variable range.

14. The image forming apparatus of claim 13 further comprising:

signal generating means for generating an initialization signal; and third controlling means for shifting said variable range in response to the initialization signal so that the median value of the shifted range would be a predetermined value, when in the second mode.

15. The image forming apparatus of claim 14 further comprising:

a document table; second detecting means for detecting the exchange of the original on the document table;

wherein said signal generating means generates the initialization signal in response to the second detecting means.

16. The image forming apparatus of claim 15 wherein said second detecting means comprises:

a cover which covers and uncovers the document table; and a switch which detects the opening and the closing of the cover to detect the exchange through the switch.

17. The image forming apparatus of claim 14 further comprising:

input means for inputting an interruption command;

wherein said signal generating means generates the initialization signal in response to the input of the interruption command.

18. The image forming apparatus of claim 17 further comprising:

second input means for inputting an interruption cancel command;

wherein third controlling means for shifting said variable range in response to the interruption cancel command so that the median value of the shifted range would be a predetermined value.

* * * * *